United States Patent Office 3,426,026
Patented Feb. 4, 1969

3,426,026
PREPARATION OF PHENANTHROLINES
Brian Colwell Ennis, Ripponlea, Victoria, and William Edgar Matthews, Armadale, Victoria, Australia, assignors to Monsanto Chemicals (Australia) Limited, West Footscray, Victoria, Australia, a company of Victoria
No Drawing. Filed Aug. 17, 1964, Ser. No. 390,171
U.S. Cl. 260—288                9 Claims
Int. Cl. C07d 39/14

This invention relates to a process for the preparation of alkyl- and aryl-substituted 1,10-phenanthrolines, the process of the invention providing high yield preparation of a wide range of 1,10-phenanthrolines which are useful for various purposes.

Alkyl-substituted phenanthrolines have been prepared by the reaction of 8-aminoquinolines with β-vinyl ketones or β-vinyl aldehydes or their precursors in the presence of large amounts of strong mineral acids, together with an oxidizing agent such as o-nitrophenol, o-nitrobenzene sulfonic acid or arsenic acid. The yields are often low, rarely exceeding 20%; moreover, the large amounts of tarry by-products formed makes the purification of the phenanthroline very difficult.

We have now discovered that alkyl- and aryl-substituted 1,10-phenanthrolines can be prepared in high yield and without the formation of large amounts of tarry by-products, thus simplying purification, by reacting a quinoline selected from 8-aminoquinolines and salts of 8-aminoquinolines, with a carbonyl component selected from β-vinyl ketones and β-vinyl aldehydes and precursors which generate such ketones and aldehydes under aqueous acidic conditions. Said β-vinyl ketones and β-vinyl aldehydes have the structure,

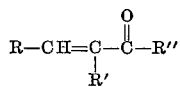

wherein R, R' and R'' are selected from hydrogen, alkyl and aryl groups. The process is practiced by heating said quinoline and said carbonyl component in a reaction medium consisting essentially of arsenic acid in a reaction stage conducted at a temperature up to about 130° C., and recovering the 1,10-phenanthroline from the reaction mixture. In the process of the invention, the arsenic acid reaction medium serves as solvent for the reactants and provides the acidic and oxidizing environment required for the reaction. Furthermore, the yield of phenanthroline is much enhanced.

Quinolines used as a reactant in the process of the invention include 8-aminoquinoline and the 8-aminoquinolines substituted in any one or more of the 2-, 3-, 4-, 5- or 6-positions with alkyl or aryl groups, the 7-position remaining unsubstituted. The alkyl groups preferably have from 1 to 4 carbon atoms, and desirably there are up to two such groups. The aryl groups are preferably phenyl, tolyl or xylyl. Particularly useful quinolines include 8-aminoquinoline, 4-methyl-8-aminoquinoline, 2,4-dimethyl-8-aminoquinoline and 3,4-dimethyl-8-aminoquinoline. Acid addition salts of the quinolines which are used in the process of the invention include the salts of mineral acids, e.g., hydrochloride and sulfate. In some cases, an acid addition salt such as the hydrochloride may be preferred in providing acidic conditions for use in conjunction with precursors for generating the β-vinyl aldehyde or β-vinyl ketone component.

The β-vinyl aldehydes used in the process of the invention preferably are those represented by the structural formula,

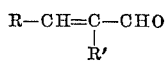

wherein R and R' are selected from hydrogen, alkyl containing from 1 to 4 carbon atoms and phenyl. Examples of such β-vinyl aldehydes are acrolein, crotonaldehyde, tiglic aldehyde, α-methacrolein, α-ethyl-β-n-propylacrolein, α-ethylacrolein, α-butylacrolein and cinnamaldehyde. Since the reaction of the invention to form 1,10-phenanthrolines involves firstly the addition of the amino group of the quinoline component across the double bond of the carbonyl component, and since the carbonyl group of α,β-unsaturated aldehydes tends to condense with aminoquinolines, which leads to the formation of unwanted side-products, there is often a definite yield advantage to be obtained by starting with a precursor of the β-vinyl aldehyde (i.e., an aldehyde derivative in which the carbonyl group is protected and which readily generates the β-vinyl aldehyde under the acidic conditions of the reaction). Precursors of β-vinyl aldehydes useful for carrying out the process of the invention can be represented by the structural formulas,

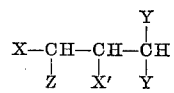

and

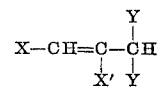

and

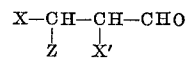

wherein X and X' are selected from hydrogen and alkyl; wherein Z is selected from hydroxy, alkoxy, acetoxy and halogen; and wherein Y is selected from alkoxy, acetoxy and halogen. In these cases, the alkyl and alkoxy groups preferably contain from 1 to 4 carbon atoms and the halogen is preferably chlorine. Thus, in the case where it is desired to use acrolein as the β-vinyl aldehyde, there is preferentially used acrolein diethyl acetal or acrolein diacetate, and other such sources of acrolein include β-chloropropionaldehyde, β-hydroxypropionaldehyde, β-alkoxypropionaldehydes and 1,1,3-trialkoxypropanes.

The β-vinyl ketones used in the process of the invention preferably are those represented by the structural formula,

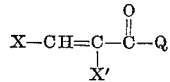

wherein X and X' are selected from hydrogen and alkyl groups containing from 1 to 4 carbon atoms; and wherein Q is selected from phenyl and alkyl groups containing from 1 to 4 carbon atoms. Examples of such β-vinyl ketones are methyl vinyl ketone, methyl isopropenyl ketone, ethyl isopropenyl ketone, phenyl propenyl ketone, pent-3-en-2-one and phenyl vinyl ketone. In the case of β-vinyl ketones, there may be no particular advantage in using a precursor equivalent as in the case of the β-vinyl aldehydes. However, β-vinyl ketones are often prepared by condensing an aldehyde with a methylene group which is alpha to the carbonyl group of the ketone, followed by dehydration of the resultant β-hydroxy ketone to the required β-vinyl ketone. Thus, methyl isopropenyl ketone is commonly prepared by condensing formaldehyde with methyl ethyl ketone which gives 1-hydroxy-2-methylbutan-3-one as intermediate, and this intermediate may be dehydrated by heating in the presence of a mineral acid catalyst to give methyl isopropenyl ketone. Accordingly, it is sometimes more convenient to use such a β-vinyl ketone precursor as a reactant in the synthesis of 1,10-phenanthrolines in accordance with the invention, the desired β-vinyl ketone being generated in situ (i.e., methyl isopropenyl ketone may be so generated from the use of 1-hydroxy-2-methylbutan-3-one as the carbonyl component). Precursors of β-vinyl ketones useful for carrying out the process of the invention can be represented by the structural formulas,

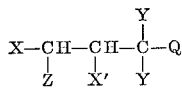

and

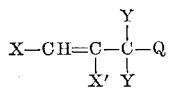

and

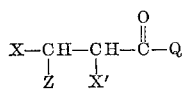

wherein X and X' are selected from hydrogen and alkyl; wherein Q is selected from alkyl and phenyl; wherein Z is selected from hydroxy, alkoxy, acetoxy and halogen; and wherein Y is selected from alkoxy, acetoxy and halogen. In these cases, the alkyl and alkoxy groups preferably contain from 1 to 4 carbon atoms and the halogen is preferably chlorine. Examples of such precursors are 1-hydroxy-2-methylbutan-3-one, 4-hydroxybutan-2-one and β-hydroxypropiophenone.

In carrying out the process of the invention, equimolar amounts of the quinoline component and the β-vinyl ketone or β-vinyl aldehyde or precursor may be used. However, we prefer to operate the process with a 10–50% molar excess of the stoichiometric amount of the β-vinyl ketone or β-vinyl aldehyde or precursor. In this way, virtually all of the quinoline component is utilized.

The arsenic acid reaction medium may be pure $H_3AsO_4$. However, the usual commercial grade of arsenic acid containing 65% $As_2O_5$ is satisfactory. The amount of arsenic acid used in the process of the invention, in constituting the reaction medium, should be such that the reaction mixture is fluid and capable of being stirred. In practice, not less than 1.5 mols/mol of quinoline component is employed, with a practical maximum amount of about 10 mols/mol of quinoline component, the preferred amount being about 2.5 mols/mol of quinoline component.

Owing to the nature of the arsenic acid reaction medium, a solvent or diluent is not normally required in carrying out the process of the invention. However, a weak organic acid diluent, such as acetic acid, or an organic diluent, such as ketone, may be used if desired. Substantial amounts of water may be present in, or added to, the reaction mixture without adversely affecting the reaction. We have found, however, that the addition of substantial amounts of a reagent such as sulfuric acid, zinc chloride and aluminium chloride, which might be expected to aid the cyclization, often adversely affects the yield of phenanthroline, although small amounts have no marked effect. In the case where a zinc or aluminium salt is so present, the phenanthroline product can precipitate as the metal complex, which can be easily decomposed to the phenanthroline base by addition of caustic soda or the like.

In general, the process of the invention can be carried out by mixing together the 8-aminoquinoline component, the β-vinyl aldehyde or β-vinyl ketone or precursor component, and the arsenic acid, and heating together at a temperature within the range of 50–130° C. until reaction is complete. We prefer to add the aldehyde or ketone or precursor component to a stirred mixture of the other two components, since this gives better control of the reaction. Thus, the aldehyde or ketone or precursor component may be added gradually to a mixture of the quinoline and arsenic acid which is refluxing at atmospheric pressure. Alternatively, the reaction components can be kept at a relatively low temperature, i.e., 20–40° C., during the mixing or addition period, and when mixing or addition is complete, the temperature gradually raised to a temperature within the range of 50–130° C. to complete the reaction. The time allowed for the reaction is not particularly critical. We have found that from one to six hours at the reflux temperature is generally sufficient for the reaction to proceed to completion. When reaction is complete, the 1,10-phenanthroline is recovered and purified by conventional procedures. In general, the excess of arsenic acid is partly neutralized with a base, such as caustic soda, and the precipitated non-basic or feebly basic impurities are removed. Further neutralization liberates the 1,10-phenanthroline, which is then isolated and purified, for example, by distillation or crystallization.

In an alternative procedure according to the invention, a β-quinolylamino aldehyde or β-quinolylamino ketone intermediate reaction product, which is obtained by contacting the quinoline component with a β-vinyl ketone or a β-vinyl aldehyde or precursor in the presence of a weak organic acid catalyst at a temperature within the range of 20–40° C., is cyclized and dehydrogenated to the 1,10-phenanthroline in a final reaction stage by being heated to a temperature up to 130° C. in a medium consisting essentially of arsenic acid. This procedure is conveniently carried out by allowing the quinoline component and the β-vinyl aldehyde or β-vinyl ketone or precursor component to react together in the presence of the weak organic acid catalyst to give the β-quinolylamino aldehyde or β-quinolylamino ketone intermediate reaction product; the intermediate product recovered and purified, for example, by distillation or crystallization; and the purified intermediate product then added gradually to a reaction medium consisting essentially of arsenic acid heated to a temperature up to 130° C., to effect cyclization and dehydrogenation to the 1,10-phenanthroline. At the end of the cyclization reaction, the 1,10-phenanthroline is isolated, for example, by neutralization of the arsenic acid, and purified by normal methods or by any special methods described in the literature.

Relatively large amounts of acetic acid may be used in preparing said β-quinolylamino aldehyde or β-quinolylamino ketone intermediate product, in this case the organic acid incidentally serving as a solvent for the reaction components; in other cases, it is possible to employ an inert diluent such as a saturated aliphatic ketone as a solvent, even though solvents are not normally required for such condensation reaction. A reaction time of three to four hours at room temperature (20° C.) is usually sufficient for the intermediate condensation reaction product to be formed in high yield; shorter times of reaction suffice at the higher temperature (40° C.). When an aldehyde or ketone precursor is used, as say a β-hydroxy aldehyde or β-hydroxy ketone, the reaction temperature and organic acid catalyst concentration should be increased to ensure that the required α,β-unsaturated carbonyl compound is liberated.

The intermediate reaction product formed as described above need not be isolated before the cyclization step, in this case the crude intermediate containing the excess of β-vinyl ketone or β-vinyl aldehyde or precursor component being directly cyclized to the 1,10-phenanthroline by being added to the refluxing arsenic acid. Advantageously, an excess of the β-vinyl ketone or β-vinyl aldehyde or precursor component (10% to 50% excess) is used in the preparation of such condensation product. A suitable addition time is 0.5 hour, after which the mixture is advantageously refluxed for a further one to two hours. Again, a large excess of arsenic acid is desirable, and it may be necessary to distill water from the mixture to maintain the reaction temperature. The 1,10-phenanthroline is recovered and purified, for example, by distillation or crystallization, as before.

The process of the invention is illustrated by the following non-limitative examples:

EXAMPLE 1

Preparation of 3,4,7,8-tetramethyl-1,10-phenanthroline (a) A mixture of 3,4-dimethyl-8-aminoquinoline (10.0 g., 0.058 mol), methyl isopropenyl ketone (4.9 g., 0.0583 mol) and glacial acetic acid (3.5 ml.) was stirred for one hour at room temperature until all the amine had dissolved. The mixture was allowed to stand at room temperature for 16 hours, and was then poured into water (50 ml.). The solid which separated was filtered off, washed with water, recrystallized from methanol, and identified as N-(3′,4′-dimethyl-8-quinolyl)-4-amino-3-methylbutan-2-one (9.8 g., 66% yield), obtained as pale lemon prisms, M.P. 73–74° C. Found: C, 74.5; H, 7.8; N, 11.1; $C_{16}H_{20}N_2O$ requires C, 74.8; H, 7.8; N, 10.9%. The purified intermediate quinolylamino ketone so prepared can be cyclized to the equivalent 1,10-phenanthroline by heating in an arsenic acid reaction medium as indicated herein.

(b) A solution containing the above-described intermediate quinolylamino ketone, prepared on the same scale and in the same way as described above but without proceeding to the separation and purification steps, was added over 0.5 hour to refluxing 80% arsenic acid (65% $As_2O_5$, 25 ml.). The solution was refluxed for two hours, then cooled and diluted with water (50 ml.), and insoluble material was filtered off. Sodium hydroxide solution was then added to neutralize the excess of arsenic acid, and the precipitated 3,4,7,8-tetramethyl - 1,10 - phenanthroline was collected, washed with water and dried. The solid was agitated with cold benzene (40 ml.), filtered off and dried, giving 10.3 g., M.P. 274–281° C. (76% of theory). Crystallization from methanol gave pure 3,4,7,8-tetramethyl-1,10-phenanthroline, M.P. 284° C.

(c) A mixture of 80% arsenic acid (117.5 g.) and 4-hydroxy-2-methylbutan-2-one (35.5 g.) was stirred at 50–70° C. while 3,4-dimethyl-8-aminoquinoline (50 g.) was added over 0.5 hour. At the end of the addition, the temperature was raised to 88° C. and stirring was continued for three hours at 88–90° C. Forty percent sodium hydroxide was then added gradually, with cooling, until the solution had a pH of 8. The precipitated solid was filtered, washed with water and dried. The solid was triturated with toluene (140 ml.) at 25° C., then filtered off and dried. The toluene-insoluble material was stirred at 25° C. for one hour with dilute acetic acid (20 g. in 380 ml. water), and insoluble material was filtered off. Sodium hydroxide solution was added to the filtrate until a slight precipitate was present; carbon (2 g.) was added, and the solution was filtered. The solution was heated to 65° C. and basified with sodium hydroxide solution. The precipitated 3,4,7,8-tetramethyl-1,10-phenanthroline was filtered off, washed with water and recrystallized from methanol, giving 42 g. (61% yield) and M.P. 280–281° C.

EXAMPLE 2

Preparation of 3,4,7-trimethyl-1,10-phenanthroline 4-methyl-8-aminoquinoline (0.498 g.) was treated with 4-hydroxy-3-methylbutan-2-one (0.4 g.) and arsenic acid (1.3 g.) under the conditions used in Example 1(c). The yield of 3,4,7 - trimethyl - 1,10 - phenanthroline, M.P. 222–223° C., was 0.336 g. (48% yield).

EXAMPLE 3

Preparation of 3,4,8-trimethyl-1,10-phenanthroline

A mixture of 3,4-dimethyl-8-aminoquinoline (8.6 g.), methacrolein diacetate (10 g.) and acetic acid (10 ml.) was heated to 90° C. for one hour. Arsenic acid (20 ml.) was then added, and the mixture was refluxed for two hours. The solution was cooled and basified to a pH of 5 with sodium hydroxide solution. Oily by-products were removed, and basification then gave the impure phenanthroline which was collected, washed with water and dried. Chromatography of a benzene solution on an alumina column gave 1.9 g. of fairly pure 3,4,8-trimethyl-1,10-phenanthroline, M.P. 195–200° C. (17% yield). Sublimation under reduced pressure, followed by crystallization from benzene, gave pure 3,4,8-trimethyl-1,10-phenanthroline, M.P. 212° C.

EXAMPLES 4–7

Preparation of di-, tri- and tetramethyl-1,10-phenanthrolines

The following general procedure was used: Each aminoquinoline (0.01 mol) set out in the table below was dissolved in acetic acid (2–3 ml.) at 30–40° C., and the corresponding α,β-unsaturated ketone (0.011 mol) was added. The mixture was left overnight, then added over 0.5 hour to refluxing 80% arsenic acid (10 ml.). The mixture was refluxed with stirring for a further three to five hours, then diluted with an equal volume of water. Sodium hydroxide solution was added to a pH of 5.5, and impurities were removed by filtration with the aid of carbon. The solution was then basified and the phenanthroline filtered off, washed with water, dried and weighed. Analytical samples were prepared by sublimation under reduced pressure followed by crystallization from benzene or methanol.

TABLE

| Example | Aminoquinoline | Unsaturated Ketone | Product | Yield, percent | m.p., ° C. |
| --- | --- | --- | --- | --- | --- |
| 4 | 8-aminoquinoline | Methyl isopropenyl ketone | 3,4-dimethyl-1,10-phenanthroline | 31 | 236 |
| 5 | 3,4-dimethyl-8-aminoquinoline | Pent-3-en-2-one | 2.4.7.8-tetramethyl-1,10-phenanthroline | 88 | 200 |
| 6 | 2,4-dimethyl-8-aminoquinoline | Pent-3-en-2-one | 2,4,7,9-tetramethyl-1,10-phenanthroline | 78 | 201 |
| 7 | 3,4-dimethyl-8-aminoquinoline | Methyl vinyl ketone | 3,4,7-trimethyl-1,10-phenanthroline | 52 | 221 |

EXAMPLE 8

Preparation of 3,4,7,8-tetramethyl-1,10-phenanthroline 3,4-dimethyl-8-aminoquinoline (2 g.), 4-hydroxy-3-methylbutan-2-one (1.5 ml.), arsenic acid (80%, 10 ml.) and water (10 ml.) were heated on a boiling water bath for 4½ hours. The reaction mixture was cooled and then neutralized with 40% NaOH. After thorough washing with hot water, the product was dried and then extracted with cold benzene to remove benzene-soluble impurities, leaving 3,4,7,8-tetramethyl - 1,10 - phenanthroline (60%) M.P. 275–279° C. Repeating the above experiment with the arsenic acid plus water being replaced by arsenic acid (80%, 20 ml.), the product was obtained in 62% of theoretical yield.

EXAMPLE 9

Preparation of 3,4,7,8-tetramethyl-1,10-phenanthroline 4-hydroxy-3-methylbutan-2-one (6.5 ml.) was added during 30 minutes to 3,4-dimethyl-8-aminoquinoline (8.6 g.), anhydrous zinc chloride (6.8 g.) and arsenic acid (80%, 15 ml.) at 90–100° C. Stirring and temperature were maintained for a further two hours, and the reaction mixture was then diluted with water (15 ml.) and cooled to room temperature. The precipitated "complex" was collected and washed with a little cold water and then boiled for five minutes with 40% NaOH (40 ml.). The precipitated phenanthroline base was collected, drained at the pump, and recrystallized from methanol to give a product (56%), M.P. 283–284° C. No appreciable amount of product was obtained from the mother liquor of the complex.

EXAMPLE 10

Preparation of 3,4,7,8-tetramethyl-1,10-phenanthroline 4-hydroxy-3-methylbutan-2-one (6.5 ml.) was added to 3,4-dimethyl-8-aminoquinoline (8.6 g.) in arsenic acid (80%, 15 ml.) and concentrated sulfuric acid (9 ml.). The addition lasted 30 minutes, and during this time the reaction mixture was maintained at 115° C. by separating water from the refluxing liquid by a Dean and Stark head. After the addition was completed, stirring and temperature were maintained for a further two hours. The reaction mixture was cooled, diluted with water (25 ml.), and neutralized with 40% NaOH. The product was purified in the usual way by benzene wash, 5% acetic acid treatment, and recrystallization from methanol to give 3,4,7,8-tetramethyl-1,10-phenanthroline.

As employed herein with regard to the β-vinyl ketone and β-vinyl aldehydes, the term "precursors" connotes those materials which are readily converted to such ketones and aldehydes under aqueous acidic condition (e.g., upon treatment with mineral acid and water). The nature of said precursors, and their use in a Skraup-type reaction, is known to the art. In addition, said Skraup reaction, the starting aminoquinolines employed therein and the phenanthroline products which are recovered are all discussed at length in Organic Reactions, volume VII, chapter 2, pages 59–98 (John Wiley and Sons, Inc., 1953).

While the invention has been described herein with regard to certain specific embodiments, it is not so limited. It is to be understood that variations and modifications thereof may be made by those skilled in the art without departing from the spirit and scope of the invention.

What is claimed is:

1. A process for the preparation of a 1,10-phenanthroline which comprises reacting a quinoline, having an unsubstituted 7-position, selected from the group consisting of (a)

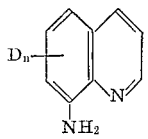

wherein D is selected from the group consisting of hydrogen, lower alkyl, phenyl, tolyl and xylyl, and $n$ is an integer from zero to two, with a carbonyl component selected from the group consisting of (b) β-vinyl ketones of the formula,

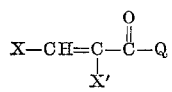

wherein X and X' are each selected from the group consisting of hydrogen and lower alkyl, and Q is selected from the group consisting of phenyl and lower alkyl, (c) β-vinyl aldehydes of the formula,

wherein R and R' are each selected from the group consisting of hydrogen, lower alkyl and phenyl, and (d) the precursors of such ketones and aldehydes which are readily converted thereto under aqueous acidic conditions, the quinoline and the carbonyl component being heated, at a temperature of from about 50° C. to about 130° C., in a reaction medium consisting essentially of arsenic acid.

2. A process as defined in claim 1 wherein the molar ratio of arsenic acid to quinoline is from about 1.5:1 to about 10:1.

3. A process as defined in claim 1 wherein the carbonyl component is first added to a mixture of the quinoline and the arsenic acid at a temperature of from about 20° C. to about 40° C.

4. A process as defined in claim 1 wherein said carbonyl component is present in from 10% to 50% molar excess relative to said quinoline.

5. A process as defined in claim 4 wherein the molar ratio of arsenic acid to quinoline is about 2.5:1.

6. A process for the preparation of a 1,10-phenanthroline which comprises heating, at a temperature of from about 50° C. to about 130° C., in a reaction medium consisting essentially of arsenic acid, a compound selected from the group consisting of β-quinolylamino aldehydes and β-quinolylamino ketones obtained by reacting, at a temperature of from about 20° C. to about 40° C., in the presence of a catalytic amount of a weak organic acid catalyst, a quinoline, having an unsubstituted 7-position, selected from the group consisting of (a)

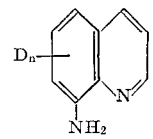

wherein D is selected from the group consisting of hydrogen, lower alkyl, phenyl, tolyl and xylyl, and $n$ is an integer from zero to two, with a carbonyl component selected from the group consisting of (b) β-vinyl ketones of the formula,

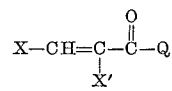

wherein X and X' are each selected from the group consisting of hydrogen and lower alkyl, and Q is selected from the group consisting of phenyl and lower alkyl, (c) β-vinyl aldehydes of the formula,

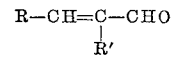

wherein R and R' are each selected from the group consisting of hydrogen, lower alkyl and phenyl, and (d) the precursors of such ketones and aldehydes which are readily converted thereto under aqueous acidic conditions.

7. A process as defined in claim 6 wherein said weak organic acid catalyst is acetic acid.

8. A process as defined in claim 6 wherein the molar ratio of arsenic acid to quinoline in said reaction medium is from about 1.5:1 to about 10:1.

9. A process as defined in claim 6 wherein said carbonyl component is present from 10% to 50% molar excess relative to said quinoline.

References Cited

UNITED STATES PATENTS 2,535,417   12/1950   Hodel _____ 260—288

FOREIGN PATENTS 282,274   6/1952   Switzerland.

OTHER REFERENCES

Elderfield Heterocyclic Compounds, vol. IV, Wiley, 1952 p. 21–4. QD400E4.

Case, J. An. Chem. Soc. vol. 70, 3994–6, 1948. QD1A5.

Willink, Rec. Tran. Chim., vol. 54, p. 282 (1935). 2D1R3.

ALEX MAZEL, *Primary Examiner.*

D. G. DAUS, *Assistant Examiner.*

U.S. Cl. X.R.

260—593, 592, 283, 601, 599, 615, 602, 541